United States Patent

[11] 3,601,798

[72] Inventor Mu-yue Hsiao
Poughkeepsie, N.Y.
[21] Appl. No. 8,251
[22] Filed Feb. 3, 1970
[45] Patented Aug. 24, 1971
[73] Assignee International Business Machines Corporation
Armonk, N.Y.

[54] ERROR CORRECTING AND DETECTING SYSTEMS

8 Claims, 9 Drawing Figs.

[52] U.S. Cl. .................... 340/146.1
[51] Int. Cl. .................... G06f 11/08, G08c 25/00
[50] Field of Search .................... 340/146.1, 172.5; 235/153; 325/41

[56] References Cited
UNITED STATES PATENTS

| | | | |
|---|---|---|---|
| 3,383,655 | 5/1968 | McRae | 340/146.1 |
| 3,398,400 | 8/1968 | Rupp et al. | 340/146.1 |
| 3,474,413 | 10/1969 | Dryden | 340/146.1 |
| 3,504,340 | 3/1970 | Allen | 340/146.1 |

*Primary Examiner*—Malcolm A. Morrison
*Assistant Examiner*—Charles E. Atkinson
*Attorneys*—Hanifin and Jancin and Harold H. Sweeney, Jr.

ABSTRACT: A single error correcting system for correcting messages of any number of data bits comprises encoding means and decoding means. The encoding means adds r check bits, each check bit representative of at most $r-1$ data bits and, on the average, each check bit representative of $>r/2$ data bits; each check bit is representative of no more than one common data bit; and each data bit is represented by exactly two check bits. The decoding means for each data bit has an error correcting circuit receiving three inputs from input circuitry, one input being the data bit itself and the other two inputs being combinations, respectively, of one of the two check bits and other data bits representative of the received data bit. The error correcting circuit is capable of producing an output correctly corresponding to the data bit if no more than one input thereto was in error. A double error detecting system, useful with this single error correcting system, inputs syndrome bits representative of each check bit and of an added parity bit to an OR circuit and to an ADDER circuit, and compares the output from these circuits.

FIG. 4

| $m_1$ | $m_2$ | $m_3$ | $m_4$ | $m_5$ | $m_6$ | $m_7$ | $m_8$ | $m_9$ | $m_{10}$ | $m_{11}$ | $m_{12}$ | $m_{13}$ | $m_{14}$ | $m_{15}$ | $C_1$ | $C_2$ | $C_3$ | $C_4$ | $C_5$ | $C_6$ | $C_7$ | |
|---|---|---|---|---|---|---|---|---|---|---|---|---|---|---|---|---|---|---|---|---|---|---|
| 1 | 1 | 1 | 1 | 1 | | | | | | | | | | | 1 | | | | | | | $S_1$ |
| 1 | | | | | 1 | 1 | 1 | 1 | | | | | | | | 1 | | | | | | $S_2$ |
| | 1 | | | | 1 | | | | 1 | 1 | 1 | | | | | | 1 | | | | | $S_3$ |
| | | 1 | | | | 1 | | | 1 | | | 1 | 1 | | | | | 1 | | | | $S_4$ |
| | | | 1 | | | | 1 | | | 1 | | 1 | | 1 | | | | | 1 | | | $S_5$ |
| | | | | 1 | | | | 1 | | | 1 | | 1 | 1 | | | | | | 1 | | $S_6$ |
| 1 | 1 | 1 | 1 | 1 | 1 | 1 | 1 | 1 | 1 | 1 | 1 | 1 | 1 | 1 | | | | | | | 1 | $S_7$ |

FIG. 5

| $m_1$ | $m_2$ | $m_3$ | $m_4$ | $m_5$ | $m_6$ | $m_7$ | $m_8$ | $m_9$ | $m_{10}$ | $m_{11}$ | $m_{12}$ | $m_{13}$ | $m_{14}$ | $m_{15}$ | $m_{16}$ | $C_1$ | $C_2$ | $C_3$ | $C_4$ | $C_5$ | $C_6$ | $C_7$ |
|---|---|---|---|---|---|---|---|---|---|---|---|---|---|---|---|---|---|---|---|---|---|---|
| 1 | 1 | 1 | 1 | 1 | | | | | | | | | | | | 1 | | | | | | |
| 1 | | | | | 1 | 1 | 1 | 1 | | | | | | | | | 1 | | | | | |
| | 1 | | | | 1 | | | | 1 | 1 | 1 | | | | | | | 1 | | | | |
| | | 1 | | | | 1 | | | 1 | | | 1 | 1 | | | | | | 1 | | | |
| | | | 1 | | | | 1 | | | 1 | | | | 1 | | | | | | 1 | | |
| | | | | 1 | | | | | | | | | 1 | 1 | 1 | | | | | | 1 | |
| | | | | | | | | 1 | | | 1 | 1 | | | 1 | | | | | | | 1 |

FIG. 5a
| | C5 | C6 | C7 | C8 |
|---|---|---|---|---|
| C1 | m1 | m2 | m3 | m4 |
| C2 | m5 | m6 | m7 | m8 |
| C3 | m9 | m10 | m11 | m12 |
| C4 | m13 | m14 | m15 | m16 |
FIG. 6
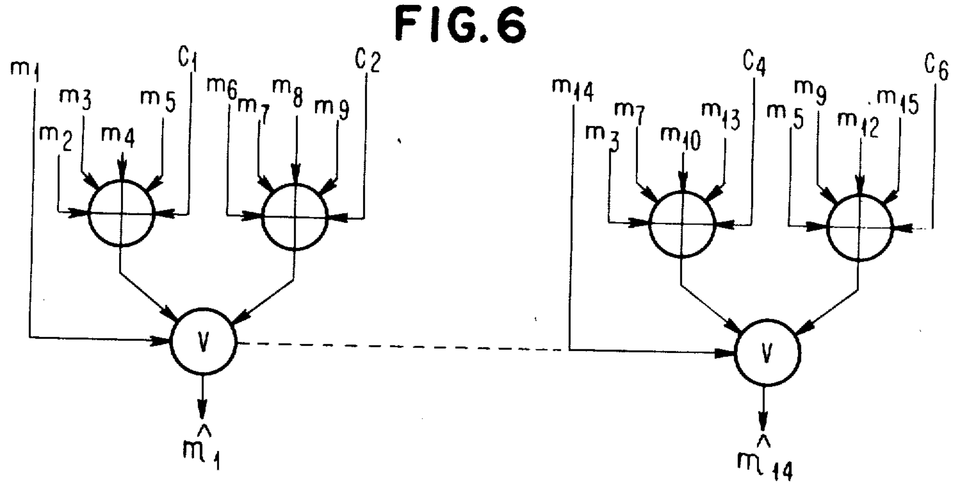
FIG. 7
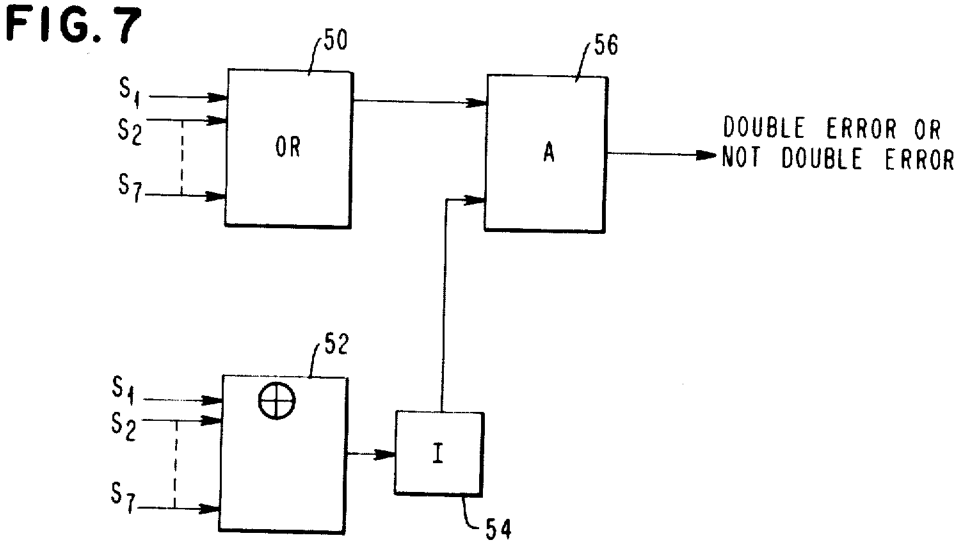

ERROR CORRECTING AND DETECTING SYSTEMS

This invention relates to error protection (e.g., detection and correction) in systems for handling (e.g., transmitting, processing, storing) information in the form of messages of data bits, particularly single error correction systems useful in parallel data handling systems such as high speed computer memories, data paths in central processing units, the interfaces of input-output channels, and other paths requiring a high degree of error protection. In addition, the invention relates to a combination of single-error correction and double error detection.

Coding systems for correcting errors in general utilize the addition, to the data bits of the message, of a number of check bits, producing a coded message which can be decoded in such a way as to correct errors introduced during storage or transmission of the message. Prior coded systems, known as Hamming codes, first set forth in U.S. Pat. No. Re 23601, although utilizing a minimum number of check bits, nonetheless are slow and difficult to decode (requiring, e.g., sequential detection and correction of the same error), involving complicated and error-prone circuitry.

In general, in coding, each check bit is a function of several bits, and the check bits are independent, i.e., each two check bits contain no more than one data bit in common. For single error correction, two check bits are provided, per data bit, and these two check bits, and the corresponding data bit, provide three data bit positions. Utilizing a majority voting type of decoding system, if an error occurs in only one position, then the correct value can be recognized from the other two positions. For multiple error correction, in general, if t is the number of errors to be corrected, then $2t+1$ positions must be provided for each data bit.

Previous majority voting correction codes have been based on Latin squares. In general, $k$ data bits are arranged into a Latin square of side $m$, where $k \leq m^2$, a Latin square of side m being an arrangement of m digits into $m^2$ subsquares of a square in such a way that every row and every column contains every digit exactly once. Each check bit corresponds to one such row or one such column, and each row and column is represented by a check bit.

The Latin square codes, in general, although simpler to decode than the Hamming codes, require a large number of check bits, even for single error correction.

An object of the present invention is to provide a single error correcting system, of the majority voting type, which utilizes a relatively small number of check bits.

Another object is to provide a new and improved class of single error correcting codes.

Another object is to provide a coding system for parallel data in a data processing system and a decoding system arranged for the encoded data which, together, will automatically correct single errors and which can also be utilized to detect double errors.

A further object is to provide simple and rapid encoding and decoding apparatus for single error correction, including errors introduced in decoding.

The invention is based on the assumption that errors are statistically independent and single errors are most likely to occur, and features a single error correcting system for a parallel data transmitting system of k data bits, in which $r$ check bits are added, the check bits representing an average number of data bits $> r/2$, each check bit representing at most $r-1$ data bits, each data bit being represented in exactly two check bits, and no two check bits representing more than one common data bit. Preferably, for any k, $$\frac{(r-l)(r)}{2} \geq k > \frac{(r-1)(r-2)}{2}.$$

and the number of data bits per check bit is as nearly equal as possible. For double error detection, an extra check bit is added, representing overall parity.

Other objects, features, and advantages will be apparent from the following description of a preferred embodiment of the present invention taken together with the attached drawings thereof in which:

FIG. 1 is a block diagram of a data processing system including an error correcting system;

FIGS. 2 and 2*a* are schematic diagrams of the general encoder form for deriving the necessary check bits;

FIGS. 4 and 5 are exemplary matrices constructed in accordance with the present invention for $k=15$ and 16, respectively;

FIG. 5*a* is a Latin square matrix for $k=16$;

FIG. 6 is a schematic circuit diagram of exemplary decoder circuitry; and

FIG. 7 is a block diagram of a double error detection system constructed in accordance with the present invention.

Figure 1:
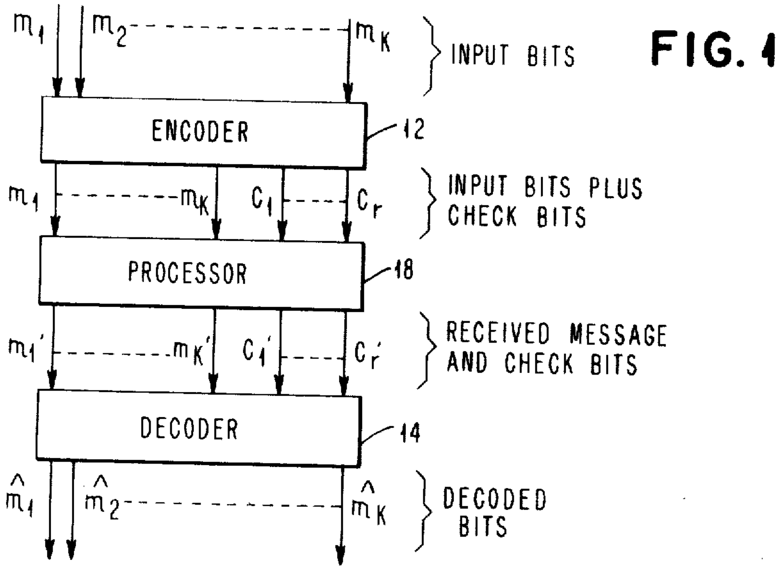
Figure 2A:
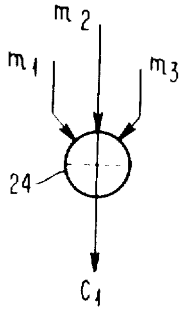
Figure 2:
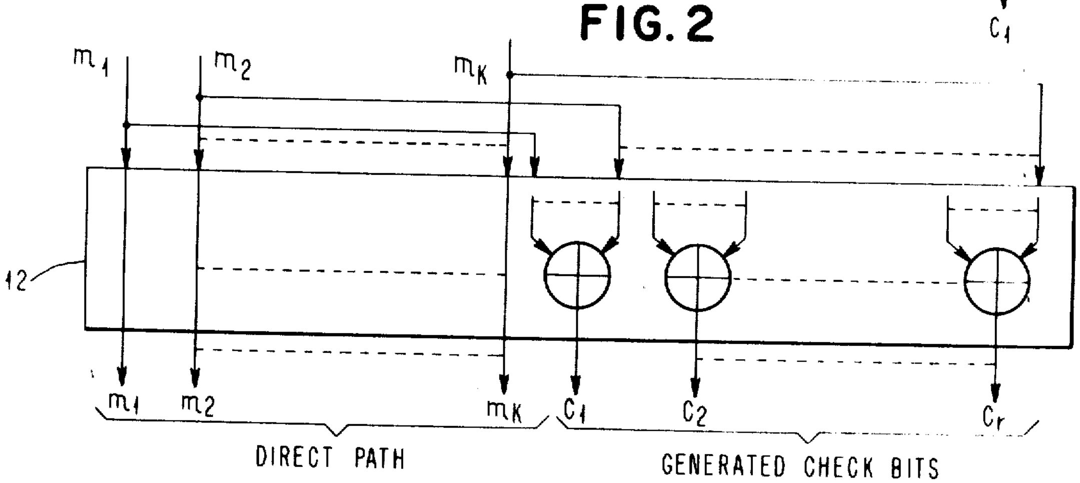
Figure 3:
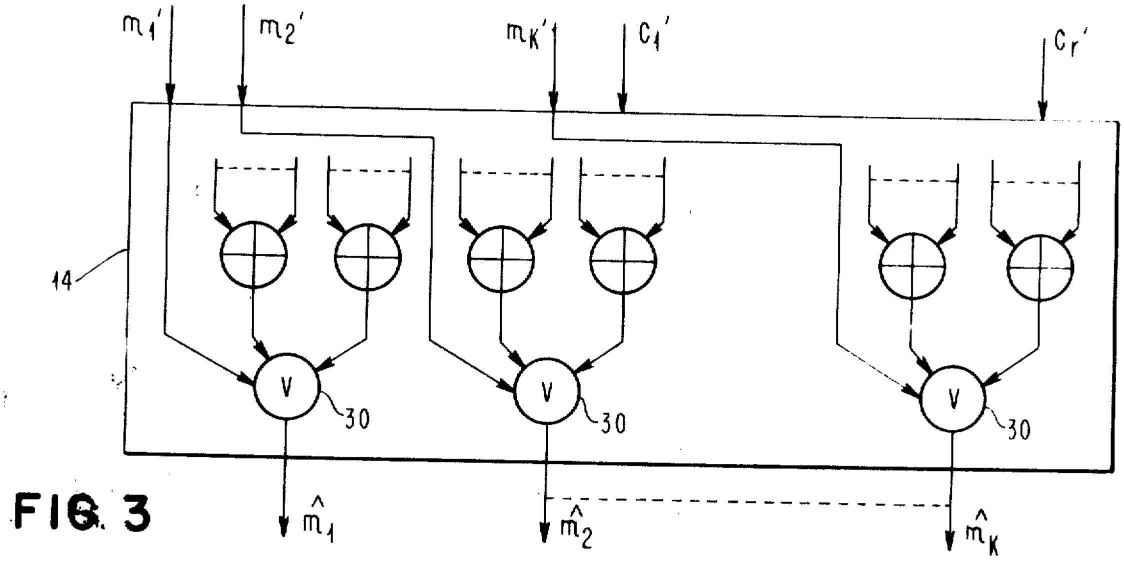
FIG. 3 is a schematic diagram of the general decoder form for the encoded messages from FIG. 2.

FIG. 1 shows an encoder 12 receiving $k$ data bits, $m_1, m_2 \ldots m_k$, and having an output of $k$ data bits plus $r$ check bits, $c_1, c_2 \ldots c_r$. A typical encoder is shown in FIG. 2, each check bit m being passed both in a direct path and in a check-bit generating path, where it is encoded in exactly two emerging check bits. As shown in FIG. 2*a*, each data bit may be fed, along with other data bits, in accordance with the coding system, to an EXCLUSIVE OR circuit, the output of which will be the corresponding check bit. Thus, in FIG. 2*a*, any three data bits such as $m_1, m_2, m_3$ are fed to EXCLUSIVE OR circuit 24 to produce a check bit $c_1$. As shown in FIG. 1, the data bits and check bits are then handled in processor 18. The information may then, when desired, be decoded in decoder 14. As shown in FIG. 3, the decoder consists of a number of majority voting circuits 30, i.e., a threshold logic circuit which produces an output signal representative of the data bit if the majority of data bit and check bit inputs thereto are correct. For a data bit $m_1$, the formula for its two check bits, $c_1, c_2$ might be:

$c_1 = m_1 \oplus m_2 \oplus m_3$ $c_2 = m_1 \oplus m_4 \oplus m_5$ These two formulas can also be written:

$m_1 = c_1 \oplus m_2 \oplus m_3$ $m_1 = c_2 \oplus m_4 \oplus m_5$ the symbol $\oplus$ representing an EXCLUSIVE OR function.

Since no common variable remains in these formulas, the presence of a single error in any of the data or check bits forming these equations affects at most one formula. Thus, $m_1$ will be given by:

$\hat{m}_1 = \text{Maj.}\,(m_1, c_1 \oplus m_2 \oplus m_3, c_2 \oplus m_4 \oplus m_5)$.

In a preferred embodiment of the present invention, for a specified $k$ number of data bits, $r$ must be such that $\binom{r}{2} \geq k$, or, to minimize $r$, $\frac{(r-l)(r)}{2} \geq k > \frac{(r-l)(r-2)}{2}$ Thus, all possible 2-out-of-$r$ combinations are utilized to minimize the number of $r$'s required for any given $k$. The data bits $m_1, m_2 \ldots m_k$ are arranged in a rectangular array of $k$ columns and $r$ rows, with each column containing exactly two data bits, and each row up to $(r-1)$ data bits with the average number of data bits per row being $>r/2$. The maximum number of data bits which can be corrected by any $r$ number of check bits is $\binom{r}{2}$. In general, the lengths of the rows $r$ are regulated so that the number of data bits in each row is as nearly equal as possible.

FIGS. 4 and 5 illustrate the rectangular arrangements for the cases $k-15$ and $k-16$. In FIG. 4, since $k=\binom{6}{2}=15$, each row $c_1$ to $c_6$ contains exactly 5 data bits, whereas in FIG. 5, since $\binom{7}{2}=21$, $k<\binom{7}{2}$, and there are five combinations $\binom{7}{2}$ unused. Thus, all rows $c_1-c_7$ contain less than $(r-1)=(6)$ elements, having either 5 or 4 elements. The extra row, $c_7$, in FIG. 4 is for double error detection, and will be described later.

Referring again to FIG. 4, the check bit formulas will be:

$c_1 = m_1 \oplus m_2 \oplus m_3 \oplus m_4 \oplus m_5$ $c_2 = m_1 \oplus m_6 \oplus m_7 \oplus m_8 \oplus m_9$ $c_3 = m_2 \oplus m_6 \oplus m_{10} \oplus m_{11} \oplus m_{12}$ $c_4 = m_3 \oplus m_7 \oplus m_{10} \oplus m_{13} \oplus m_{14}$ $c_5 = m_4 \oplus m_8 \oplus m_{11} \oplus m_{13} \oplus m_{15}$
$c_6 = m_5 \oplus m_9 \oplus m_{12} \oplus m_{14} \oplus m_{15}$ For each data bit, therefore, the input to each voting circuit will be, e.g., $m_1$
$m_1 = m_2 \oplus m_3 \oplus m_4 \oplus m_5 \oplus c_1$
$m_6 \oplus m_7 \oplus m_8 \oplus m_9 \oplus c_2$
$m_{12}$
$m_{12} = m_2 \oplus m_6 \oplus m_{10} \oplus m_{11} \oplus c_3$
$m_5 \oplus m_9 \oplus m_{14} \oplus m_{15} \oplus c_6$
$m_{14}$
$m_{14} = m_3 \oplus m_7 \oplus m_{10} \oplus m_{13} \oplus c_4$
$m_5 \oplus m_9 \oplus m_{12} \oplus m_{15} \oplus c_6$ Circuitry for decoding $k=15$ data bits is shown in FIG. 6. The output of each voting circuit, where the majority of data bit inputs are correct, will be a signal representative of the data bit.

To illustrate the reduced number of check bits required by a coding system constructed in accordance with the present invention, consider the Latin Square arrangement for $m=16$ (FIG. 5a). In general, for such an arrangement, $k \leq (r/2)2$. There are exactly $r/2$ rows and $r/2$ columns, all of the locations of which may or may not be filled. Thus, for $k=16$, there are 8 check bits, as opposed to 7 for the coding system of the present invention. For $k=17$, the next highest square, 25, would have to be used, and hence $r=10$. Yet for the coding system of the present invention, $r$ would still be only 7 for $k=17$. The following table illustrates this divergence. It is noted that the Hamming code utilizes fewer check bits in all cases, but the Hamming code is not decodable by simple majority voting circuitry.

TABLE.—COMPARISON OF CHECK BITS

| Given $k$ data bits | Number of $r$ check bits | | |
|---|---|---|---|
| | Hamming code | $\binom{r}{2}$ code | Latin square code |
| 6 | | 4 | 6 |
| 8 | 4 | 5 | 6 |
| 10 | 4 | 5 | 8 |
| 11 | 4 | 6 | 8 |
| : | : | : | : |
| 15 | 4 | 6 | 8 |
| 16 | 5 | 7 | 8 |
| 17 | 5 | 7 | 10 |
| : | : | : | : |
| 21 | 5 | 7 | 10 |
| 22 | 5 | 8 | 10 |
| 26 | 5 | 8 | 12 |
| : | : | : | : |
| 28 | 5 | 8 | 12 |
| 29 | 5 | 9 | 12 |
| : | : | : | : |
| 32 | 6 | 9 | 12 |
| : | : | : | : |
| 36 | 6 | 9 | 12 |
| 37 | 6 | 10 | 14 |
| : | : | : | : |
| 45 | 6 | 10 | 14 |
| 46 | 6 | 11 | 14 |
| : | : | : | : |
| 50 | 6 | 11 | 16 |
| 55 | 6 | 11 | 16 |
| 56 | 6 | 12 | 16 |
| : | : | : | : |
| 64 | 7 | 12 | 16 |
| : | : | : | : |
| 65 | 7 | 12 | 18 |
| 66 | 7 | 12 | 18 |
| 67 | 7 | 13 | 18 |
| : | : | : | : |
| 78 | 7 | 13 | 18 |
| 79 | 7 | 14 | 18 |
| : | : | : | : |
| 81 | 7 | 14 | 20 |
| : | : | : | : |
| 91 | 7 | 14 | 20 |
| 92 | 7 | 15 | 20 |
| : | : | : | : |
| 101 | 7 | 15 | 22 |

The decreased number of check bits provides additional data bit space in processor 18.

To combine a double error detection system with the single error correction system, an additional row is added to the $\binom{r}{2}$ matrix of FIG. 4 such that all columns of the matrix have odd weight, providing a parity bit $c_7$. The syndrome bit $S$, for each row, will be designated $S_1, S_2 \ldots S_{r+1}$, where, e.g., $S_1 = c_1 \oplus (m_1 \oplus m_2 \oplus m_3 \oplus m_4 \oplus m_5)$
$S_5 = c_5 \oplus (m_4 \oplus m_8 \oplus m_{11} \oplus m_{13} \oplus m_{15})$ and
$S_{r+1} = S_7 = \Sigma m_k$ The syndrome bit $S_{r+1}$ ensures that an error in a single bit will appear in three syndrome bits, and therefore when all the syndrome bits are added, the error will show as a single error. When there are two errors, the errors will cancel.

Then referring to FIG. 7, OR circuit 50 will have an output conditioning one terminal of AND circuit 56 only if any $S_r$ or $S_{r+1} = 1$. Any S will equal 0 so long as the corresponding portion of the message received by the encoder is not in error. For example, $S_1 = 0$ when $c_1 = (m_1 \oplus m_2 \oplus m_3 \oplus m_4 \oplus m_5)$. If one S (or more than one S) = 1, the output of circuit 50 will be 1. If all S = 0, then the output of circuit 50 will be 0 (= no output).

The syndrome bits are also summed in ADDER circuit 52, the output of which will be 0 for 0 errors, 1 for 1 error, and 0 again for two errors. The output of circuit 52 is fed through an inverter 54 to the other terminal of AND circuit 56, so that the input to circuit 56 is:

0 for 1 error; and,
1 for 0 or 2 errors

AND circuit 56 will thus have an output only if it receives a 1 signal from OR circuit 50 indicative of at least one error and a 1 signal from AND circuit 52 indicative of two rather than zero errors in view of the indication of the presence of error from circuit 50. Of course, since a single error will be corrected in the decoding, it is unnecessary to know the presence of a single error. However, since double errors will not be corrected, an appropriate detection device, such as described, is desireable.

The $\binom{r}{2}$ coding system described thus enables the use of fewer check bits for the same number of data bits or, put another way, enables a greater number of data bits per check bit in the transmitted message, thus more efficiently using the data handling equipment.

I claim:

1. In a system for handling information in the form of messages of data bits, a single error correcting system for correcting messages of any number of data bits $k$ comprising
encoding means for adding $r$ check bits to said data bits, each check bit being representative of a number of data bits, the average number of data bits per check bit being $>r/2$ and the maximum number for any check bit being $r-1$, any two check bits being representative of no more than 1 common data bit, and each data bit being represented by exactly two check bits, and
decoding means including an error correcting circuit and input circuitry for said error correcting circuit,
said input circuitry transmitting three inputs to said error correcting circuit for each data bit, said inputs for each data bit being the data bit itself and the two combinations of check bits and other data bits representing said data bit,
said error correcting circuit being capable of producing output signals correctly corresponding to each of said data bits is in error.

2. The system of claim 1 wherein said error correcting circuit comprises a threshold logic circuit for each of said data bits with said threshold fixed to produce an output signal of a value corresponding to that of the majority of inputs to said logic circuit.

3. The system of claim 1 wherein said input circuitry comprises two EXCLUSIVE OR circuits for each data bit each having inputs consisting of up to $r-1$ data bits and one of said check bits.

4. The system of claim 1 wherein $r-1)(r)/2 \geq k > (r-1)(r-2)/2$.

5. The system of claim 4 wherein said $k$ data bits are distributed among said $r$ check bits as evenly as possible.

6. The system of claim 4 wherein $k = \binom{r}{2}$.

7. In combination with the single error correcting system of claim 1, a double error detecting system comprising
an OR circuit and an ADDER circuit, arranged in parallel,
input circuitry for transmitting identical inputs to said OR and ADDER circuits, said inputs consisting of $r+1$ syndrome bits, S, where each $S_r$ syndrome bit represents one check bit and the data bits represented by said check bits, each $S_r$ having one value when its check bit and data bits correspond, and the opposite value when its check bit and data bits do not correspond, and the $S_{n+1}$ syndrome bit represents both a parity bit representative of the sum of $k$ data bits and the said data bits, $S_{r+1}$ having one value when its parity bit and data bits correspond and the opposite value when its parity bit and data bits do not correspond, said OR circuit producing an error output when at least one of said $S_{r+1}$ syndrome bits is of said opposite value, and said ADDER circuit producing an error output when an odd number of said $S_{r+1}$ syndrome bits are of said opposite value, and a comparison circuitry for comparing the outputs of said OR circuit and said ADDER circuit to produce an error signal when only said OR circuit has an error output, indicating a double handling error.

8. The double error detecting system of claim 7 wherein said comparison circuit consists of an inverter for inverting the output of said ADDER circuit and an AND circuit having one input from said OR circuit and the other input from said inverter, said AND circuit producing an error signal when said inputs are both error inputs.

PO-1050
(5/69)

UNITED STATES PATENT OFFICE
CERTIFICATE OF CORRECTION

Patent No. 3,601,798 Dated August 24, 1971

Inventor(s) Mu-yue Hsiao

It is certified that error appears in the above-identified patent and that said Letters Patent are hereby corrected as shown below:

Column 4, line 57, after the word "bits", insert the words --where no more than one of said inputs for that data bit--. Column 4, line 67, after the word "wherein", insert --(--.

Signed and sealed this 18th day of January 1972.

(SEAL)
Attest:

EDWARD M.FLETCHER,JR.
Attesting Officer

ROBERT GOTTSCHALK
Acting Commissioner of Patents